(12) United States Patent
Akamatsu

(10) Patent No.: US 7,168,312 B2
(45) Date of Patent: Jan. 30, 2007

(54) HEATING RESISTOR TYPE AIR FLOW METER

(75) Inventor: Masuo Akamatsu, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 57 days.

(21) Appl. No.: 11/138,321

(22) Filed: May 27, 2005

(65) Prior Publication Data

US 2005/0268711 A1 Dec. 8, 2005

(30) Foreign Application Priority Data

Jun. 2, 2004 (JP) .............................. 2004-164145

(51) Int. Cl.
*G01F 1/68* (2006.01)
(52) U.S. Cl. .................................................. 73/204.15
(58) Field of Classification Search ............. 73/204.15, 73/204.16, 204.17, 204.25
See application file for complete search history.

(56) References Cited

U.S. PATENT DOCUMENTS 4,450,719 A * 5/1984 Nishimura et al. ...... 73/204.15
4,787,251 A * 11/1988 Kolodjski ..................... 73/755
4,984,460 A * 1/1991 Isoda ...................... 73/204.15

FOREIGN PATENT DOCUMENTS

| EP | 0606983 | 7/1994 |
|---|---|---|
| EP | 1118842 | 7/2001 |
| EP | 1316781 | 6/2003 |
| JP | 05-157602 | 6/1993 |
| JP | 08-304136 | 11/1996 |
| JP | 09-203650 | 8/1997 |
| JP | 2001-201382 | 7/2001 |

* cited by examiner

*Primary Examiner*—Jewel Thompson
(74) *Attorney, Agent, or Firm*—Crowell & Moring LLP

(57) ABSTRACT

In a heating resistor type air flow meter, a temperature characteristic of an air flow rate signal whose output value varies with temperature of the air flow meter circuitry is compensated by the temperature characteristic compensation circuit. The compensation circuit produces a temperature characteristic signal for compensation which changes in response to changes in an ambient temperature, and converts this signal into a predetermined proportional signal. The predetermined proportional signal is added to the air flow rate signal and such an addition result signal is input to the output control circuit and the temperature characteristic of the air flow rate signal is compensated. The resistors for proportional adjustment are external to and connected through a terminal to the IC of the air flow meter.

7 Claims, 5 Drawing Sheets

HEATING RESISTOR TYPE AIR FLOW METER

CLAIM OF PRIORITTY

The present application claims priority from Japanese application serial no. 2004-164145, filed on Jun. 2, 2004, the content of which is hereby incorporated by reference into this application.

FIELD OF THE INVENTION

The present invention relates to an air flow meter using a heating resistor, for example, a heating resistor type air flow meter that is used for a device for measuring an intake air flow rate of an engine to control an internal combustion engine for vehicle or the like.

BACKGROUND OF THE INVENTION

A heating resistor type air flow meter of prior art related to the present invention will be described with FIG. 2. This prior art example is disclosed in Japanese Patent Laid-Open No. H9 (1997)-203650.

A heating resistor 1 is formed by a temperature-sensitive resistor having a temperature-dependent resistance characteristic and placed in an passage of airflow to be measured. Actually, the heating resistor 1 is provided in a Wheatstone bridge circuit which is not shown, together with a flow rate signal producing element (resistor 2) and a temperature-sensitive resistor for air-temperature compensation, which is not shown. A heating current flowing through the heating resistor 1 is controlled by a heating current control circuit 10 to maintain the heating resistor 1 at a predetermined heating temperature (resistance value) with regard to the air-temperature.

Since this heating current varies depending on air flow rate, the heating current is converted into a voltage as an air flow rate signal V2.

The heating current flows through the heating resistor 1, even when the flow rate of the air is zero. Therefore, the sensed flow rate signal V2 is subjected to zero adjustment as well as amplification using an output control circuit 20, and a flow rate characteristic signal Vout is output. A reference voltage V0 required for zero adjustment is supplied by an internal reference voltage generator circuit 30.

In the resistor elements and the internal reference voltage generator circuit which constitute the air flow meter, characteristics of resistance or the like thereof vary with changes in circuit temperature, resulting in variation in the flow rate characteristic signal Vout. Therefore, it is needed to compensate its temperature characteristic (output variation).

Such a characteristic compensation is performed using a plurality of voltage dividing resistors 31, 32, 33, 34, and one of which is a resistor for adjustment. Variations (gradient) in outputs of the flow meter at known two-point temperatures are observed beforehand, and the resistance value of the resistor for adjustment is adjusted to produce an offset signal to offset the variations in the output. Moreover, Variations (non-linear line) in outputs of the flow meter at known three-point temperatures is observed beforehand, and the resistance value of a resistor 35 is adjusted to output a signal for compensating for the linearity. The adjustments as above are easily implemented by a laser trimming method.

The internal reference voltage generator circuit 30 is configured by a bandgap reference voltage generator circuit utilizing the bandgap of silicon. This voltage generator circuit 30, the heating current control circuit 10, and the output control circuit 20 are integrally formed in a semiconductor integrated circuit (IC) 3 except for some of the resistors.

In the above circuit configuration, if the temperature characteristic compensation circuit is constructed by using transistors integrated into the IC 3, the number of components of the flow meter can be reduced and the circuit board can be made smaller.

The adjusting resistor for temperature characteristic compensation is external to the IC 3 because of its adjustment function. In the bandgap reference voltage generator circuit, it is unsuitable that only the adjusting resistor is external to the IC and other resistors are integrated into the monolithic IC for the following reason.

The resistors integrated into the monolithic IC are affected by variance in diffusion, which results in variation in the temperature characteristic of the reference voltage. Consequently, it is difficult to adjust the characteristic of the flow meter. Therefore, if the adjusting resistor in the bandgap reference voltage generator circuit is external to the IC, all resistors in the voltage generator circuit need to be external to the IC to ensure the precision of the flow meter.

For this reason, in the prior art embodiment of FIG. 2, the adjusting resistors 31, 32, 33, 34 for adjusting the flow meter characteristic at two-point temperatures are external to the IC. Besides, the adjusting resistor 35 for linearity compensation for the bandgap reference voltage generator circuit (with a temperature coefficient different from that of the above adjusting resistors) is also incorporated into an external circuit with the adjusting resistors. In consequence, it is necessary to equip the IC with three or more terminals. Increase in the number of connection terminals of the IC becomes a bottleneck in reducing the dimensions of the air flow meter and reducing its cost.

[Patent document 1] Japanese Patent Laid-Open No. H9 (1997)-203650

SUMMARY OF THE INVENTION

The present invention is to reduce the number of connection terminals for external elements for adjustment in the temperature characteristic compensation circuit, and to realize an air flow meter that is practically immune to variance in diffusion even if the resistors for temperature characteristic compensation are integrated into the monolithic IC.

The present invention is principally configured as follows.

In a heating resistor type air flow meter, a temperature characteristic of an air flow rate signal whose output value varies with temperature of the air flow meter circuitry is compensated by a temperature characteristic compensation circuit as follows.

This temperature characteristic compensation circuit comprises a circuit for producing a temperature characteristic signal for compensation which changes in response to changes in an ambient temperature, and a circuit for converting the temperature characteristic signal into a predetermined proportional signal. The predetermined proportional signal is added to the air flow rate signal and such an addition result signal is input to an output control circuit.

According to the above configuration, in an overall circuit which produces the air flow rate signal, when an overall resistance value of resistor elements and resistive component of circuits changes depending on changes in ambient temperature (circuitry temperature), the output value of the air flow rate signal varies. At that time, the temperature characteristic compensation circuit produces a signal (temperature characteristic signal) that changes following the same gradient as the temperature characteristic of the output value of the air flow rate signal. By inputting this signal (temperature characteristic signal) to the output control circuit to offset the temperature-varying output of the air flow rate signal, the temperature characteristic of the air flow rate signal is compensated. In this case, a proportion of the temperature characteristic signal is adjusted and input to the output control circuit to properly compensate the temperature characteristic of the air flow rate signal.

According to a preferred embodiment of the present invention, for instance, the output control circuit is configured by an operational amplifier that amplifies the air flow rate signal. The temperature characteristic compensation circuit produces a current having a temperature characteristic, namely a current which changes depending on changes of an ambient temperature, divides this current into two currents at a predetermined ratio, and produces predetermined proportional signals to the divided by converting the divided currents into voltages. Then, the compensation circuit inputs the predetermined proportional signals to positive (+) and negative (−) input terminals of the operational amplifier.

According to the above configuration, resistors for proportional adjustment of the signal for use in the temperature characteristic compensation circuit are formed by external resistors to a semiconductor integrated circuit (IC) that forms a main circuit of the air flow meter, and other related resistors are formed in the monolithic IC. Even if the temperature coefficient of the external resistors differs from that of the resistors in the monolithic IC, the precision of temperature characteristic compensation can be maintained at a favorable level. Further details will be described in the following description of embodiments.

Because the present invention can configure a temperature characteristic adjustment circuit with a single connection terminal on the IC, a high-precision and smaller air flow meter and its IC can be realized.

DETAILED DESCRIPTION OF THE PREFERRED EMBODIMENTS

Figure 1:
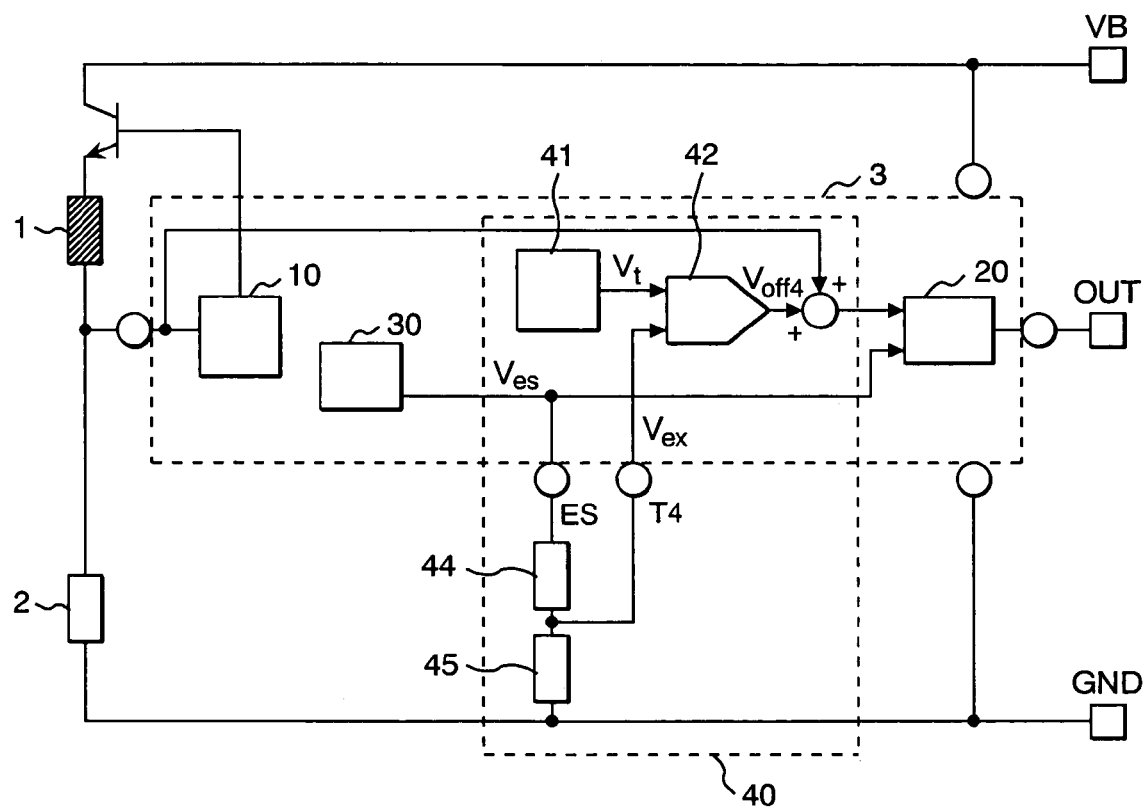
FIG. 1 is an equivalent circuit diagram of an embodiment of the present invention.

FIG. 1 is an equivalent circuit diagram of a heating resistor type air flow meter according to a first embodiment of the present invention.

Figure 2:
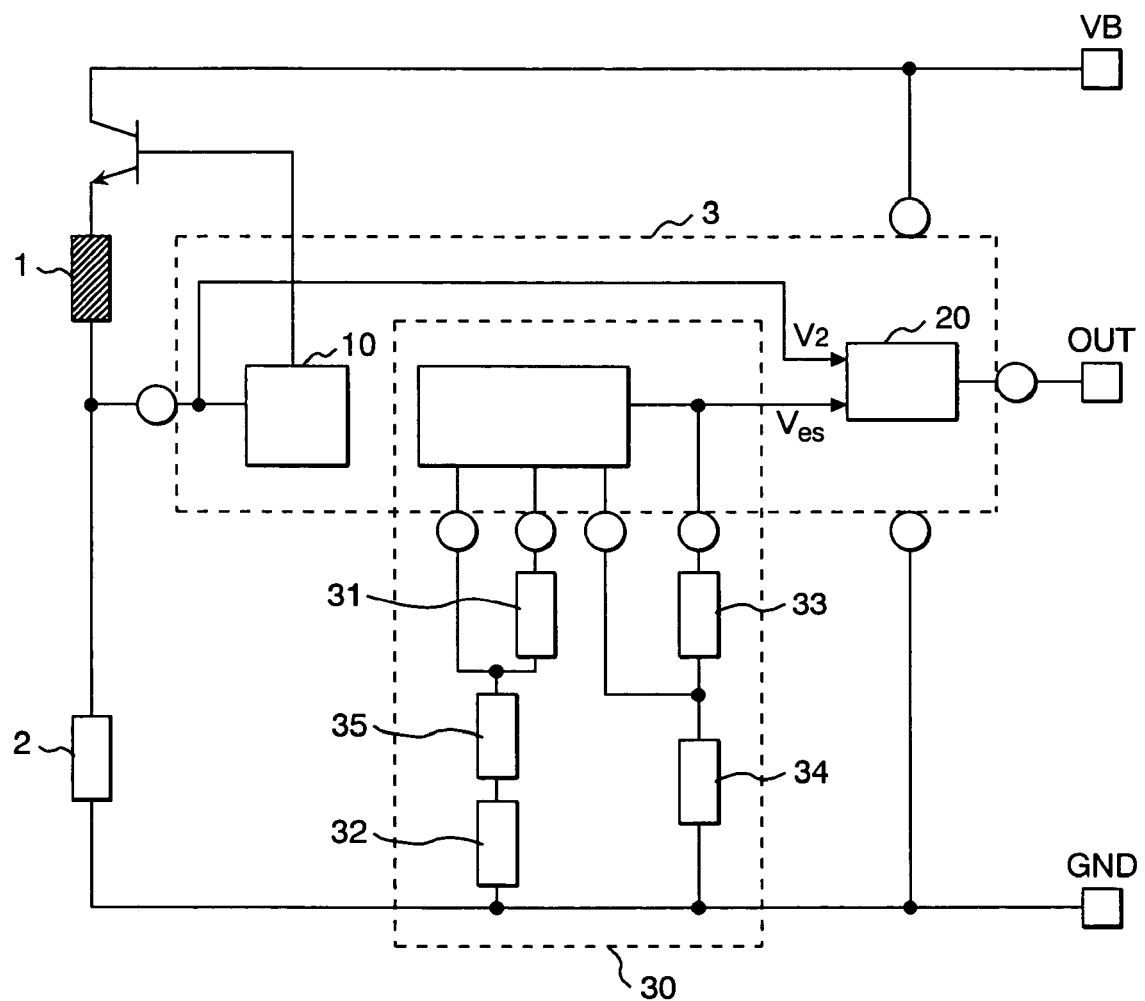
FIG. 2 is a circuit schematic diagram of an embodiment of prior art.

In FIG. 1, a heating resistor 1, a heating current control circuit 10, and a flow rate sensing element 2 are configured the same as the corresponding ones in the air flow meter of the prior art example described for FIG. 2 and their explanation is not repeated.

The air flow meter of the first embodiment is provided with a temperature characteristic compensation circuit 40 that compensates the characteristic of an air flow rate signal whose output value varies depending on changes of the air flow meter circuitry-temperature, that is, the temperature characteristic of the air flow rate signal.

The temperature characteristic compensation circuit 40 includes a temperature characteristic voltage producing circuit (hereinafter referred to as a "Vt circuit") 41 which produces a temperature characteristic voltage (for example, a voltage proportional to temperature) Vt and a proportional adjustment circuit 42 which converts the temperature characteristic voltage (signal) Vt into a predetermined proportional voltage.

The voltage from an internal reference voltage generator 30 that is formed by a bandgap reference voltage generator circuit is divided by resistors 44, 45. The divided voltage is input as a proportional adjustment signal Vex to the proportional adjustment circuit 42.

The proportional adjustment circuit 42 converts the temperature characteristic voltage Vt into a predetermined proportional voltage, based on the proportional adjustment signal Vex. The predetermined proportional voltage Voff4 as a result of the conversion is added to an air flow rate signal V2 and such an addition result signal is input to the output control circuit 20.

A series resistance value of the resistors 44 and 45 is set as a resistance value to make a zero offset signal Ves. The zero offset signal Ves is input to the output control circuit 20 through a terminal Es.

Figure 5:
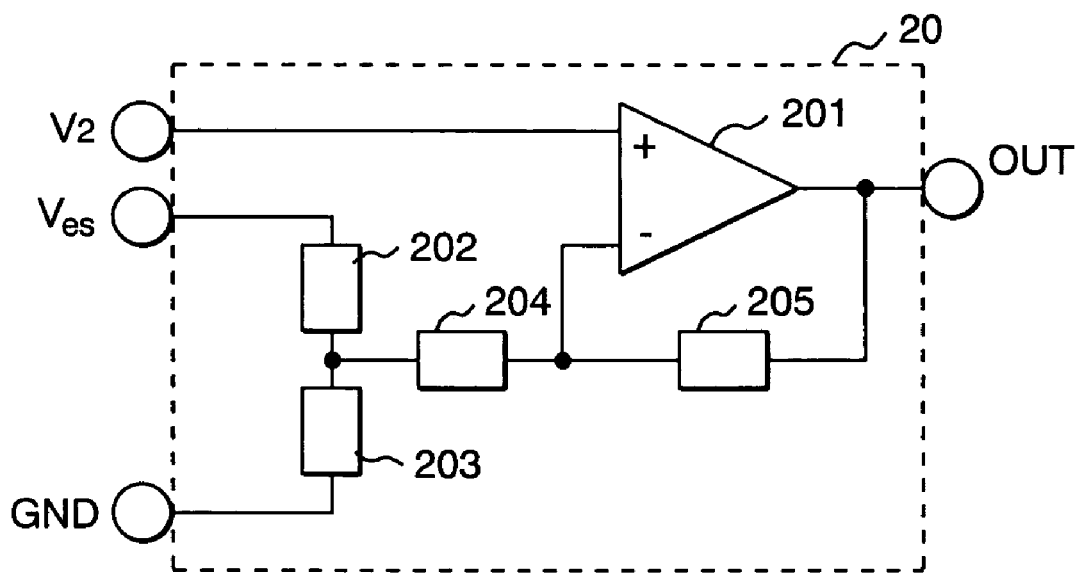
FIG. 5 shows an example of an output control circuit that is used in the above embodiment.

The output control circuit 20 is constituted by, for example, a differential amplifier circuit or the like. The air flow rate signal V2 to which the proportional signal Voff4 for temperature characteristic compensation was added and the zero offset signal Ves are input to the output control circuit 20. FIG. 5 shows an example of the output control circuit 20 which is formed, for example, by an operational amplifier 201 and its associated resistors (e.g., voltage dividing resistors, input resistor, and feedback resistor) 202 to 205. V2 is input to a positive (+) terminal of the operational amplifier 201, and Ves is input to a negative (−) terminal thereof via the voltage dividing resistors 202, 203 and the input resistor 204.

The output control circuit 20 outputs an air flow rate signal Vout with temperature characteristic compensation and zero adjustment based on these input signals.

A divided voltage Vex is used to determine the characteristic (gradient) of the output Voff4 of the proportional adjustment circuit 42 at two-point temperatures. That is, Vex is determined by adjusting the voltage dividing resistors 44, 45 beforehand to set Voff4 suitable for compensating (correcting) temperature-variation in the output Vout of the air flow meter.

Here, the IC 3 comprises the heating current control circuit 10, the output control circuit 20, the internal reference voltage generator circuit 30, the temperature characteristic voltage generating circuit 41, and the proportional adjustment circuit 42. On the other hand, the resistors 44 and 45 are external to the IC 3, as described hereinbefore, and formed by thick-film resistors having a stable temperature characteristic. The resistors 44, 45 and the sensing resistor 2 are placed together with the IC 3 on a printed circuit board and connected to the IC 3 through their appropriate terminals. A terminal ES is for zero adjustment voltage input and the terminal T4 is for proportional adjustment voltage input.

The resistance values of the resistors 44, 45 are determined by, for example, laser trimming in the stage of manufacturing the air flow meter. More specifically, prior to the laser trimming, a known flow rate signal V2 (its dummy signal is acceptable) is produced beforehand under an environment where the air flow meter experiences two-point temperatures (e.g., 25° C. and 85° C.). And the temperature characteristic of the output V2 is found at the two-point temperatures. The resistance values to produce the proportional output Voff4 and the zero adjustment voltage Ves that can compensate the above temperature characteristic are determined based on the above found characteristic, and the resistors 44, 45 are laser trimmed to provide such resistance values.

As described above, the output (flow rate signal) Vout of the air flow meter varies with changes in the circuit temperature. This is due to the temperature characteristics of the resistor elements and the internal reference voltage generator circuit which are components of the air flow meter and, therefore, such characteristic variation needs to be corrected (compensated).

Since the output Voff4 that is added to the air flow rate signal V2 offsets the temperature-variation in the flow rate signal V2, variation in the output Vout of the air flow meter due to the temperature characteristics can be prevented.

The Vt circuit 41 generates the temperature characteristic voltage that is expressed by $Vt=a1+a2\times T$, where T is temperature and $a1$, $a2$ are proportionality constants.

According to the first embodiment, the air flow rate signal that was adjusted by temperature characteristic compensation and zero compensation is output from the output control circuit 20.

Moreover, output precision of the flow rate signal of the air flow meter can be enhanced over a wide range of temperature. Further the temperature characteristic of the air flow rate signal is compensated by proportional adjustment of the temperature characteristic signal for compensation. According to the proportional adjustment, even if resistors for compensation are integrated into the monolithic IC 3 except for the resistors 44, 45 for proportional adjustment, current mirrors can be adopted so that the characteristic variations of the resistors in the monolithic IC can offset each other (details will be described for circuitry shown in FIG. 4). Therefore, adjustment for temperature characteristic compensation in the flow meter can be performed by providing only one additional terminal for the elements external to the IC 3 for compensation.

A second embodiment of the present invention will be described with an equivalent circuit diagram shown in FIG. 3.

Figure 3:
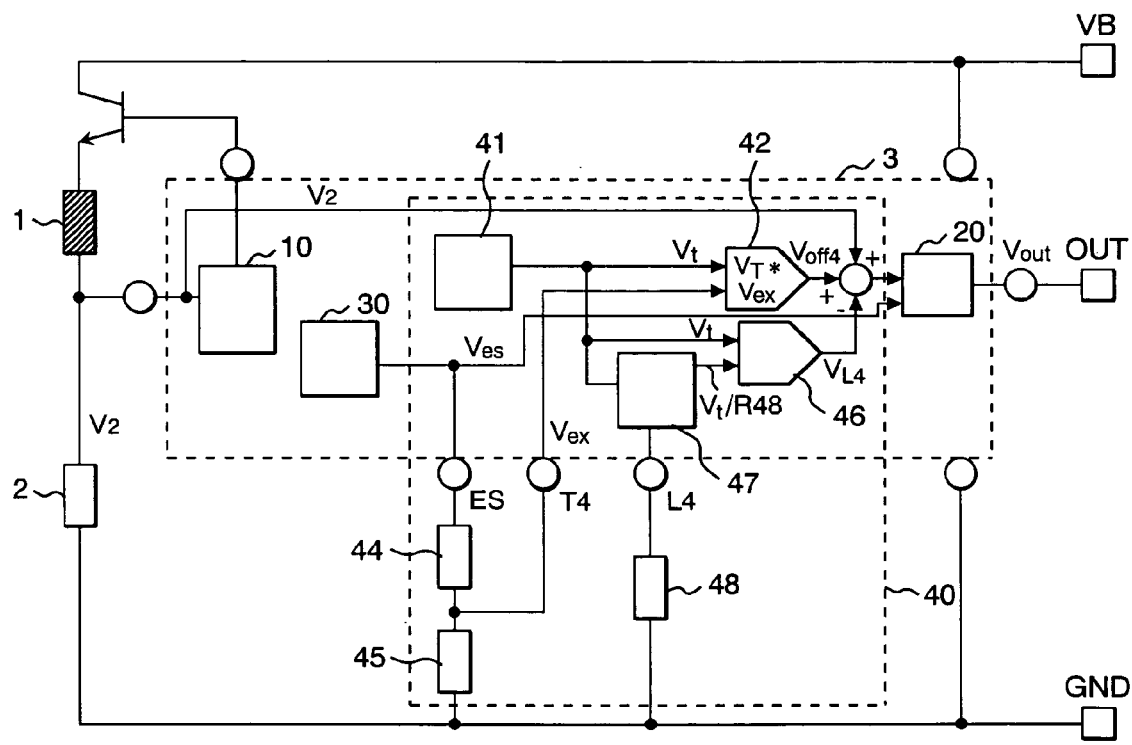
FIG. 3 is an equivalent circuit diagram of an embodiment of the present invention.

In FIG. 3, the same reference numbers as in the above FIG. 1 denote the same or common components as found in FIG. 1. The air flow meter configuration of the second embodiment is essentially the same as that of the first embodiment, but as a point of difference between both, the second embodiment is characterized in that a linearity compensation function is added to correct nonlinearity of the air flow rate signal V2.

For this purpose, a linearity compensation circuit 46, a linearity offset adjustment circuit 47, and an adjusting resistor 48 for use in the adjustment circuit are added.

The linearity compensation circuit 46 is configured by a kind of multiplier. The output (temperature characteristic voltage) of the Vt circuit 41 is input to one input terminal of the circuit 46, and a signal for linearity offset adjustment produced by the linearity offset adjustment circuit 47 is input to the other input terminal thereof.

The linearity offset adjustment circuit 47 generates a signal ($Vt/R_{48}$) as a result of dividing the output Vt from the Vt circuit 41 by the value $R_{48}$ of the resistor 48. The linearity compensation circuit 46 multiplies Vt and $Vt/R_{48}$ together, thus outputting $Vt^2/R_{48}$ which is a quadratic function of temperature T as $VL_4$.

The output Voff4 (signal for temperature characteristic compensation) from the proportional adjustment circuit 42, the zero offset signal $V_0$, and the output $VL_4$ from the linearity offset adjustment circuit 47 are added to the flow rate signal V2 from the flow rate sensing resistor 2. Such an addition result signal is input to the output control circuit 20. The nonlinear component depending to temperatures T is included in the output V2. $VL_4$ is added in a direction which offsets the nonlinear component.

An output Vout subjected to linearity compensation in addition to temperature characteristic compensation and zero compensation is amplified and output from the output control circuit 20.

The linearity compensation circuit 46 and the linearity offset adjustment circuit 47 are formed within the IC 3 and its adjusting resistor 48 is external and connected to the IC 3 through a terminal L4.

The resistance value R48 of the resistor 48 is adjusted by laser trimming in the process of manufacturing the air flow meter. Prior to the laser trimming, in an environment where the air flow meter experiences three-point temperatures (e.g., −30° C., +25° C., and 70° C.), a known flow rate signal V2 (its dummy signal is acceptable) is generated beforehand. Nonlinearity of the output V2 is observed and a linearity offset $Vt/R_{48}$ is determined based on the nonlinearity. The resistor 48 is laser trimmed to provide the resistance value $R_{48}$ determined from the linearity offset $Vt/R_{48}$. The resistor 48 is formed by a thick-film resistor having a stable temperature characteristic.

After linearity adjustment is performed, laser trimming of the resistors 44, 45 for adjustments of temperature characteristic compensation and zero compensation of the flow rate signals at two-point temperatures is performed, as described for FIG. 1.

According to the second embodiment, output precision of the flow rate signal of the air flow meter can be enhanced over a wide range of temperature. And the adjustments of temperature characteristic compensation at two-point temperatures and the linearity adjustment (compensation) of the flow meter are performed through two connection terminals T4 and L4 of the IC.

Figure 4:
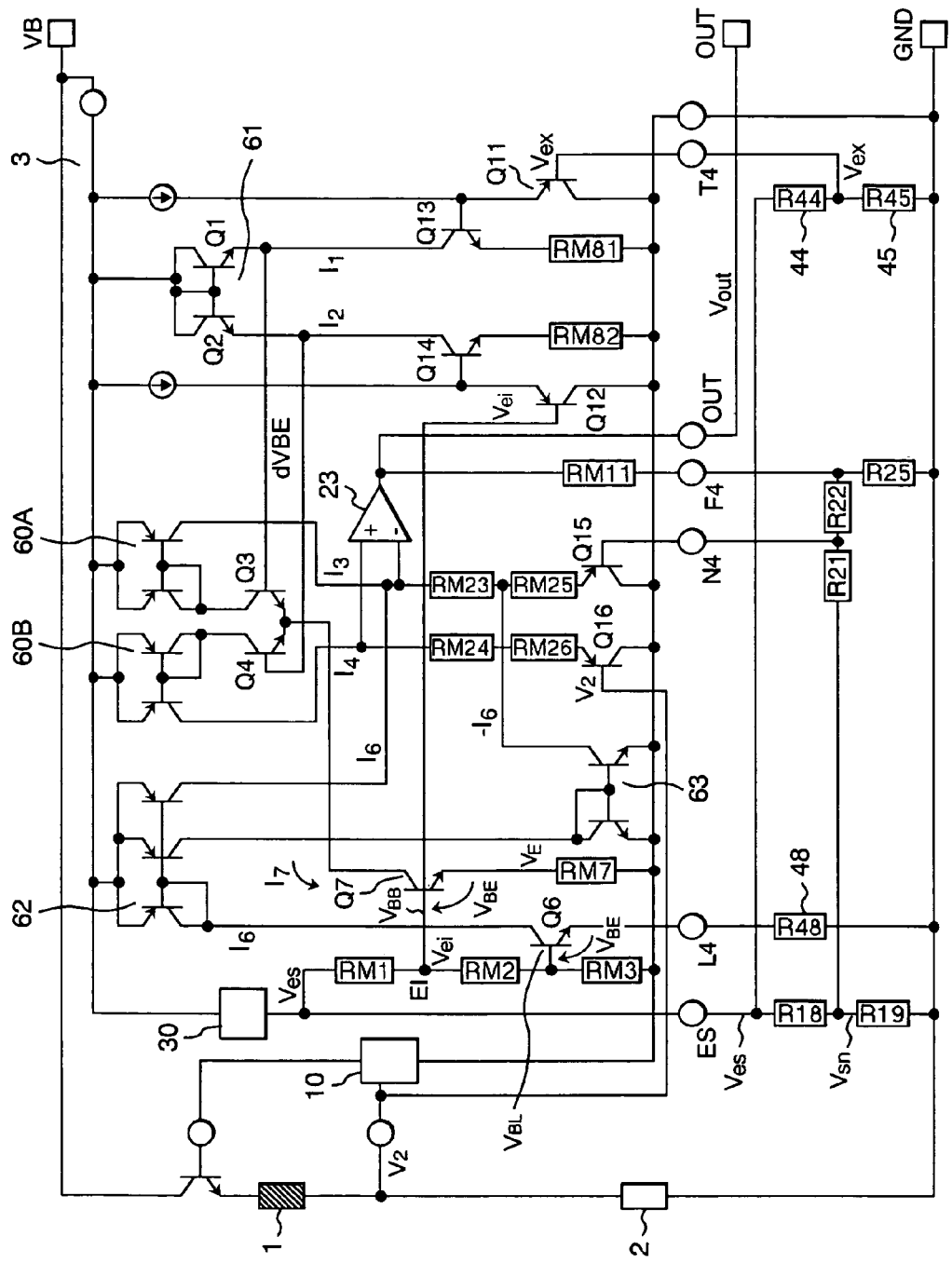
FIG. 4 is a circuit schematic diagram of an embodiment of the present invention.

FIG. 4 shows a circuitry implementation of the air flow meter of the second embodiment (FIG. 3) of the present invention, using transistors.

In the embodiment of FIG. 4, series resistors RM24, RM26 for signal input are connected to a positive (+) input terminal of an operational amplifier 23 as the output control circuit 20 and series resistors RM23, RM25 are connected to a negative (−) input terminal thereof, where RM denotes a resistor in the monolithic IC.

A transistor Q7 and a resistor RM7 in the monolithic IC are components of the Vt circuit (temperature characteristic voltage generating circuit) 41 in FIG. 3. A fixed voltage Vei as a result of dividing the reference voltage Ves from the internal reference voltage generator circuit 30 by resistors RM1, RM2, and RM3 is input as VBB to the base of the transistor Q7. The emitter potential VE of the transistor Q7 has a temperature characteristic which VE varies in an increase direction depending on increase of the temperature in the transistor (increase of the temperature of the IC 3).

The emitter potential VE is expresses as the product of the resistance value of the resistor RM7 and the current I7. The VE varying depending on temperature means that the current I7 also varies depending on temperature. By taking advantage of variation in the current I7, that is, variation in the VE (corresponds to the temperature characteristic voltage Vt in FIG. 3; I7=VE/RM7), temperature characteristic compensation is performed as follows.

The current I7 flowing through the resistor RM7 is expressed, using the voltage Vei as a result of dividing the reference voltage Ves, as in the equation below:

$$I7=VE/RM7=(Vei-VBE)/RM7 \quad \text{(Equation 1)}$$

The current I7 is distributed into I3 and I4 via transistors Q3, Q4 and a current distribute circuit (current mirror circuits) 60A, 60B. A distribution ratio between the currents I3 and I4 is determined by voltage dividing resistors 44, 45, transistors Q1, Q2 constituting a current mirror circuit 61, input transistors Q11, Q12, Q13, Q14 for distribution adjustment, and resistors RM81, RM82 in the monolithic IC, and the like.

The divided voltage Vex produced by dividing the internal reference voltage Ves by the resistors 44, 45 is input to the base of the transistor Q13 via the transistor Q11 in a constant current circuit. On the other hand, the divided voltage Vei produced by dividing the internal reference voltage Ves by the resistors RM1, RM2, and RM3 in the monolithic IC is input to the base of the transistor Q14 via the transistor Q12 in the constant current circuit.

With these voltages Vei, Vex, currents I1, I2 flowing through the transistors Q1, Q2 are expressed by equations 2 and 3.

$$I1=Vex/RM81 \quad \text{(Equation 2)}$$

$$I2=Vei/RM82 \quad \text{(Equation 3)}$$

When RM81 and RM82 are set to have equal resistance values, the following is expressed:

$$I1/I2=Vei/Vex \quad \text{(Equation 4)}$$

Difference $dV_{BE}$ in base-emitter voltage VBE between the transistors Q1 and Q2 is expressed by equation 5.

$$dVBE=(kT/q)\times\{\ln I2\} \quad \text{(Equation 5)}$$

where, k is a Boltzmann constant, T is temperature, Q is charge, and ln is a logarithm.

As shown in FIG. 4, by connecting the emitter of the transistor Q1 to the base of the transistor Q3 and connecting the emitter of the transistor Q2 to the base of the transistor Q4, equation 6 is fulfilled.

$$(kT/q)\ln\{I1/I2\}=(kT/q)\times\ln\{I4/I3\} \quad \text{(Equation 6)}$$

Hence, $$I1/I2=I4/I3 \quad \text{(Equation 7)}$$

By equations 4, 7, the following is obtained.

$$I4/I3=Vei/Vex \quad \text{(Equation 8)}$$

That is, a current distribution ratio between the transistors Q3 and Q4 is determined by adjusting the voltage Vex that is applied through an external connection terminal T4 to the transistor Q11 in the IC 3.

One distributed current I4 is converted into a voltage through the resistors RM24, RM26 in the monolithic IC. This voltage signal as a result of the conversion represents a portion of VE (the emitter potential of the transistor Q7) that corresponds to the temperature characteristic voltage Vt and is proportionally adjusted (divided). This proportionally adjusted signal V4 is added to the detected flow rate signal V2 from the transistor Q16, and such an addition result signal is input to the positive (+) terminal of the operational amplifier 23.

The other distributed current I3 is converted into a voltage through the resistors RM23, RM25 in the monolithic IC. This voltage signal V3 as a result of the conversion is input to the negative (−) terminal of the operational amplifier 23. The negative (−) terminal of the operational amplifier 23 also takes in a voltage Vsn produced by dividing the internal reference voltage Ves by external resistors R18, r19 as a zero offset voltage. Moreover, the negative (−) terminal of the operational amplifier 23 takes in a linearity offset signal component VioL corresponding to VL4 of the flow rate signal V2, produced by converting current I6, which will be described later, into a voltage through the resistors RM23, RM25.

The above voltages V3, V4 correspond to the output Voff4 (the signal for temperature characteristic compensation) from the proportional adjustment circuit 42 in the embodiments of FIGS. 1 and 3.

Before explaining the linearity offset signal VioL, here, influence of the temperature of the resistors RMn (e.g., RM7, RM23 to RM 26, etc.) in the monolithic IC on the current I7 produced by the temperature characteristic voltage Vt will be described.

The base-emitter voltage VBE of the transistor Q7 for generating the temperature characteristic voltage has a gradient with temperature of about −2 mV/° C. This can be approximated as in equation 9.

$$VBE=VBE20-0.002(T-20) \quad \text{(Equation 9)}$$

where VBE20 is the base-emitter voltage of the transistor at a normal temperature of 20° C.

When the temperature coefficient of a resistor RMn in the monolithic IC is α and the resistance value of the resistor at 20° C. is represented as RMn_20, the temperature characteristic of the resistor is expressed as follows:

$$RMn=RMn\_20(1+\alpha(T-20)) \quad \text{(Equation 10)}$$

The current I7 flowing through the resistor RM7 is expressed by equation 11.

$$I7=\{Vei-(VBE\_20-0.002(T-20)\}/\{RM7\_20(1+\alpha(T-20)\} \quad \text{(Equation 11)}$$

where $V_{BE}\_20$ is the base-emitter voltage at 20° C.

Signal difference between the distributed currents I3 and I4 is expressed by equation 12.

$$Vio = (RM24 + RM26) \times I4 - (RM23 + RM25) \times I3 \quad \text{(Equation 12)}$$

$$RM23 = RM24, RM25 = RM26 \quad \text{(Equation 13)}$$

$$Vio = (RM23 + RM25) \times (I4 - I3) \quad \text{(Equation 14)}$$

$$= (RM23 + RM25) \times I7 \times (Vex - Vei)/(Vex + Vei) \quad \text{(Equation 15)}$$

$$= (RM23 + RM25)/RM7 \times (Vex - Vei)/(Vex + Vei) \quad \text{(Equation 16)}$$
$$\{Vei - (V_{BE}\_20 - 0.002(T-20))\}$$

$$= (RM23\_20 + RM25\_20)/RM7\_20 \times \quad \text{(Equation 17)}$$
$$(Vex - Vei)/(Vex + Vei)$$
$$\{Vei - (V_{BE}\_20 - 0.002(T-20))\}$$

Because the resistance values in the IC vary at a same ratio, the resistance variations offset each other, as is obvious from equation 17, and a temperature characteristic adjustment circuit not depending on the variations in the IC is obtained.

Next, the current I6 that produces a linearity offset signal component is explained.

A resistor 48 (with a resistance value of R48) connected to a terminal L4 is a resistor element independent of the IC 3. Thus, a resistor element in which resistance variation with temperature is sufficiently smaller than that of a resistor in the monolithic IC can be used as this resistor.

A voltage VBL produced by dividing the internal reference voltage Ves by the resistors RM1, RM2, and RM3 in the monolithic IC is applied to the base of a transistor Q6 connected to a current mirror circuit 62. The current I6 flowing through the transistor Q2 is expressed as follows:

$$I6 = (VBL - VBE)/R48 \quad \text{(Equation 18)}$$

The current I6 is caused to flow through a resistor RM23 in the monolithic IC by the current mirror 62 and a current mirror 63. Since the resistor RM23 in the monolithic IC is connected to the negative (−) terminal of the operational amplifier 23, in addition to the signal (voltage) corresponding to the foregoing current I3, the following signal is input to that terminal.

$$VioL = -RM23 \times I6 \quad \text{(Equation 19)}$$

$$= -RM23\_20(1 + \alpha(T - 20)) \times (VBL - VBE)/R4 \quad \text{(Equation 20)}$$

$$= -RM23\_20(1 + \alpha(T - 20)) \times \{VBL - (VBE\_20 - 0.002(T - 20))\}/R48 \quad \text{(Equation 21)}$$

The equation 21 is a quadratic function of temperature T. Therefore, by adjusting the resistance value of the resistor R48 connected to the terminal L4 beforehand and inputting the VioL signal component to the negative (−) terminal of the operational amplifier 23, the linearity of the temperature characteristic can be compensated besides the flow meter output characteristic at two-point temperatures. However, the linearity offset is somewhat affected by resistance variations of the resistors in the monolithic IC.

According to the present embodiment, the characteristic of the flow meter at two-point temperatures and the linearity of the temperature characteristic can be compensated by providing the IC only two connection terminals T4, L4.

The present invention can be applied to various types of sensors having a wide range of operating temperature and requiring reduced size and high performance.

In the foregoing embodiments, current flowing through the heating resistor is converted into a voltage, thus generating an air flow rate signal; however, the invention is not so limited. For instance, temperature-sensitive resistors are installed upstream and downstream of the heating resistor and an air flow rate is sensed, based on a temperature difference between both temperature-sensitive resistors. Any method that can utilize the heating current control of the heating resistor falls in the scope of application of the present invention.

What is claimed is:

1. A heating resistor type air flow meter comprising a heating resistor placed in an air flow passage, a heating current control circuit for controlling a heating current flowing through said heating resistor to maintain said heating resistor at a constant temperature, a flow rate sensing circuit for producing an air flow rate signal through the use of heating current control of said heating resistor, an output control circuit for amplifying and outputting said air flow rate signal, a temperature characteristic compensation circuit for compensating a temperature characteristic of said air flow rate signal whose output value varies with changes of temperature of the air flow meter circuitry, wherein said temperature characteristic compensation circuit comprises a circuit for producing a temperature characteristic signal for compensation which changes in response to changes in an ambient temperature, and a circuit for converting said temperature characteristic signal into a predetermined proportional signal, and wherein said predetermined proportional signal is added to said air flow rate signal and such an addition result signal is input to said output control circuit.

2. A heating resistor type air flow meter comprising:

a heating resistor placed in a air flow passage;

a heating current control circuit for controlling a heating current flowing through said heating resistor to maintain the temperature of said heating resistor at a constant temperature;

a flow rate sensing circuit for producing an air flow rate signal through the use of heating current control of said heating resistor, an operational amplifier for taking in said air flow rate signal and amplifies the signal; and a temperature characteristic compensation circuit for, in order to compensate the temperature characteristic of said air flow rate signal, producing a current having a temperature characteristic, namely a current which changes depending on changes of an ambient temperature, dividing this current into currents at a predetermined ratio, producing predetermined proportional signals to the divided currents by converting the divided currents into voltages, and inputs the proportional signals to positive (+) and negative (−) input terminals of said operational amplifier.

3. The heating resistor type air flow meter according to claim 2, wherein said heating current control circuit, said output control circuit, and said temperature characteristic compensation circuit are integrally formed in a semiconductor integrated circuit except for some of resistors, resistors for adjusting the ratio between said divided currents is installed external to and connected through a terminal to said semiconductor integrated circuit, and resistors for converting said divided currents into voltages are formed in the monolithic semiconductor integrated circuit.

4. The heating resistor type air flow meter according to claim 3, wherein said resistors for adjusting the ratio between the currents have resistance temperature coefficients different from that of said resistors in the monolithic circuit.

5. The heating resistor type air flow meter according to claim 3, wherein said temperature characteristic compensation circuit divides said current having the temperature characteristic into two currents by using current mirror circuits, based on voltage values of said resistors for adjusting the ratio.

6. The heating resistor type air flow meter according to claim 2, wherein one of the predetermined proportional signals produced by said temperature characteristic compensation circuit is added to said air flow rate signal and such an addition result signal is input to the positive (+) input terminal of said operational amplifier, and the other predetermined proportional signal is added to a zero offset signal to the air flow rate signal and such an addition result signal is input to the negative (−) input terminal of said operational amplifier.

7. The heating resistor type air flow meter according to claim 2, wherein one of the predetermined proportional signals generated by said temperature characteristic compensation circuit is added to said air flow rate signal and such an addition result signal is input to the positive (+) input terminal of said operational amplifier, and the other predetermined proportional signal is added to a zero offset signal and a linearity offset signal to the air flow rate signal and such an addition result signal is input to the negative (−) input terminal of said operational amplifier.

* * * * *